April 1, 1958 S. D. WILTSE 2,828,979
FLANGED PIPES COUPLED BY RESILIENT SEALING GASKET
HAVING VENTURI-LIKE FLUID PASSAGE
Filed Jan. 19, 1953 2 Sheets-Sheet 1

INVENTOR.
SUMNER D. WILTSE
BY Whittemore,
Hulbert & Belknap
ATTORNEYS

April 1, 1958 S. D. WILTSE 2,828,979
FLANGED PIPES COUPLED BY RESILIENT SEALING GASKET
HAVING VENTURI-LIKE FLUID PASSAGE
Filed Jan. 19, 1953 2 Sheets-Sheet 2
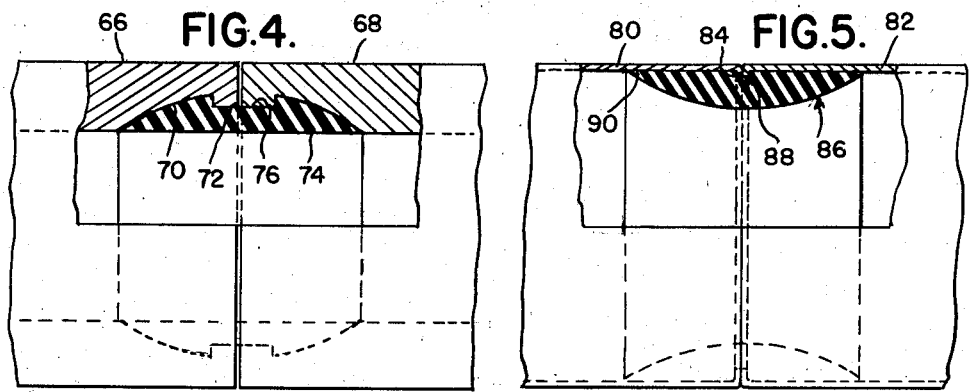
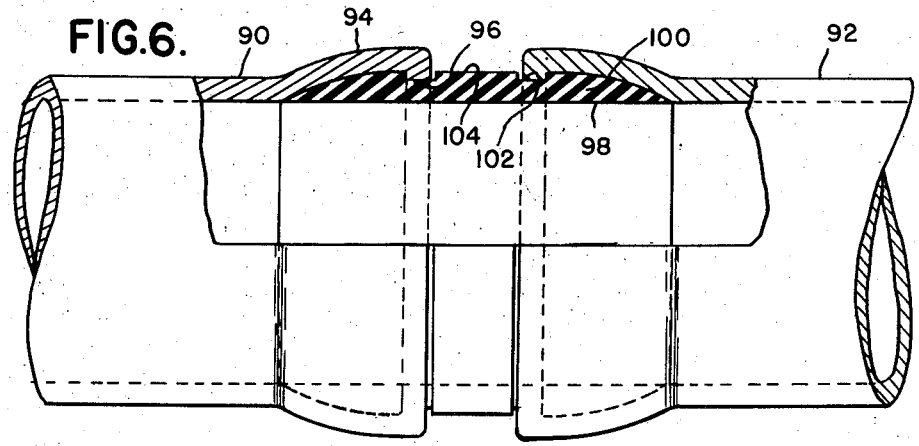
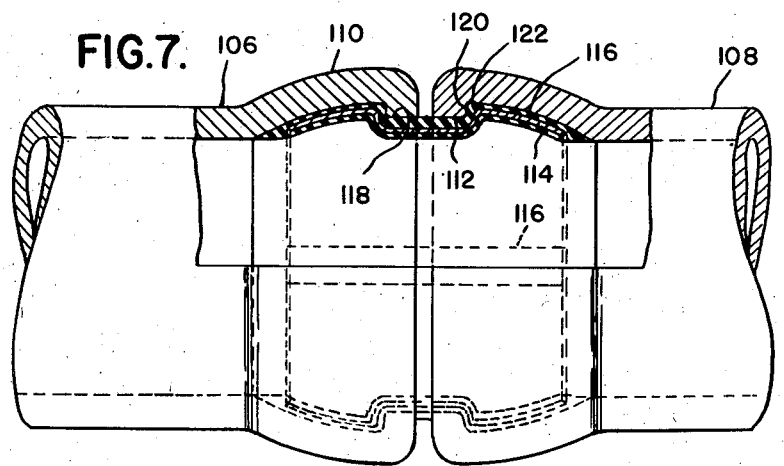
INVENTOR.
SUMNER D. WILTSE
BY Whittemore
Hulbert & Belknap
ATTORNEYS

United States Patent Office 2,828,979
Patented Apr. 1, 1958

2,828,979

FLANGED PIPES COUPLED BY RESILIENT SEALING GASKET HAVING VENTURI-LIKE FLUID PASSAGE

Sumner D. Wiltse, Detroit, Mich.

Application January 19, 1953, Serial No. 331,889

1 Claim. (Cl. 285—109)

The present invention relates to a tube or pipe coupling, and more particularly to such a coupling characterized by the use of a resilient annular gasket insertable into the open ends of adjacent tubes and adapted to provide a mechanical interconnection and a fluid-tight seal for said tubes.

It is an object of the present invention to provide a tube coupling comprising a pair of tubes having inwardly directed continuous flanges at adjacent ends thereof in combination with an annular gasket formed of resilient material and provided with annular groove means on the exterior surface thereof adapted to receive said flanges.

It is a further object of the present invention to provide a tube coupling including an annular coupling and sealing element characterized by the ease with which the coupling may be effected, and the efficiency of the mechanical coupling and seal produced thereby.

It is a feature of the present invention to provide a tube coupling including adjacent tube ends having continuous annular inwardly directed flanges at the adjacent ends thereof, an annular gasket formed of resilient material having annular external groove means providing abutment shoulders, the flanges being receivable in said groove means and engageable with said shoulders.

It is a further feature of the present invention to provide a construction as described above in which the gasket is of maximum wall thickness intermediate its ends and tapers to substantially knife edged end portions.

It is a further feature of the present invention to provide a tube coupling as described above which comprises a sleeve received within the opening through the gasket.

It is a further feature of the present invention to provide a tube coupling as described above in which the sleeve is a cylindrical metal sleeve provided with a longitudinal split to provide for radial expansion thereof.

It is a further feature of the present invention to provide a tube coupling as described in the foregoing in which the ends of the tubes are radially enlarged and in which the gasket is dimensioned to fit snugly within the enlargements of said tube ends and is provided with a substantially cylindrical opening therethrough.

It is a further feature of the present invention to provide a tube coupling as described in the foregoing in which the ends of the tubes are of the same diameter as the center portions thereof and in which the gasket is of generally cylindrical external shape and is of tapered wall thickness to provide substantially knife edged end portions and to provide a Venturi passage therethrough.

Other objects and features of the invention will become apparent as the description proceeds, especially when taken in conjunction with the accompanying drawings, wherein:

Figure 4 is a view similar to Figure 1 showing a further modified form of tube coupling.

Figure 5 is a view similar to Figure 1 showing a further modified form of tube coupling.

Figure 6 is a view similar to Figure 1 showing a further modified form of tube coupling.

Figure 7 is a view similar to Figure 1 showing still a further modified form of tube coupling.

Figure 1:
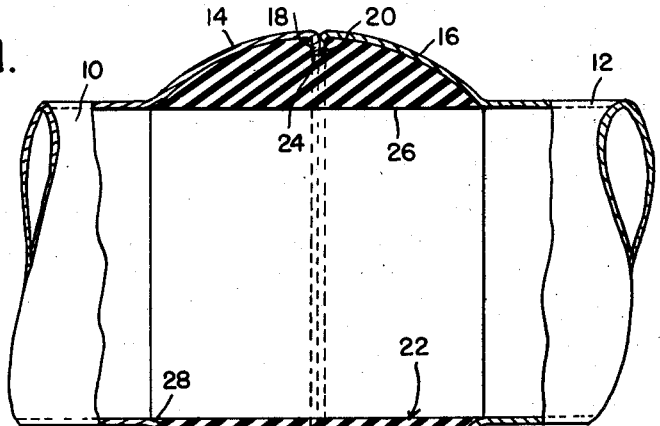
Figure 1 is a side elevation of a tube coupling embodying the present invention, partly in section.

Referring now to Figure 1 a tube coupling is illustrated as adapted to interconnect a pair of tubes 10 and 12, which in this embodiment of the invention are illustrated as thin walled metal tubes. The adjacent ends of the tubes 10 and 12 are enlarged as indicated at 14 and 16 respectively to provide spheroidal enlargements, the center of curvature of which is located on the axes of the tubes 10 and 12. The ends of the tubes 10 and 12 are bent inwardly to provide radial flanges 18 and 20.

In order to interconnect the tubes 10 and 12 there is provided a coupling and sealing gasket 22. The outer surface of the gasket 22 is also spheroidal and is shaped to fit snugly within the spheroidal chamber provided by the enlargements 14 and 16. Intermediate the ends of the gasket 22 there is provided an annular groove or recess 24 within which the flanges 18 and 20 are received. It will be observed that the groove 24 is provided with substantially radial opposed abutment shoulders against which the inner surfaces of the flanges 18 and 20 engage, and the width of the groove 24 is such that the abutting flanges 18 and 20 are snugly received therein.

The gasket 22 is provided with a cylindrical opening 26 therethrough, which as illustrated in the figure is of substantially the same diameter or cross-section as the internal diameter or cross-section of the tubes 10 and 12. Accordingly, the gasket 22 offers no restriction to flow of fluid through the tube system. It will further be observed that the gasket 22 has a wall section intermediate its ends of maximum thickness and which tapers toward each end thereof terminating in substantially knife edged end portions 28.

The material of the gasket 22 may be selected from well known materials, the requirement being that the material is yieldable and resilient. Accordingly, rubber is an excellent material for use in the gasket although other materials such as suitable plastics or resins may be selected in accordance with their known physical properties.

When the tube system is subjected to pressure the flexible resilient end portions 28 of the gasket are forced against the inner adjacent surface of the tubes providing an effective seal. Moreover, pressure applied to the gasket throughout its inner surface presses the material of the gasket firmly against the inner surface of the enlargements 14 and 16. Separation between the tubes 10 and 12 is effectively prevented by the engagement of the flanges 18 and 20 and the cooperating abutment shoulders of the groove 24. The tube coupling is designed for use in systems of moderate pressure and the gasket 22 is effective to prevent separation between the tubes 10 and 12.

In assembling the tube system the gasket 22 is pressed into place in one of the enlargements 14 or 16 so that the corresponding flange of the tube enters the groove 24. Thereafter, the other tube is pressed against the protruding end of the gasket until its flange enters into the groove 24, thus completing the assembly illustrated in Figure 1. Due to the resilient nature of the gasket the outer surface portion thereof may be displaced by movement of the flanges thereover but when the flanges register with the external groove 24 the material expands to form a secure interlock with the flanges.

Figure 2:
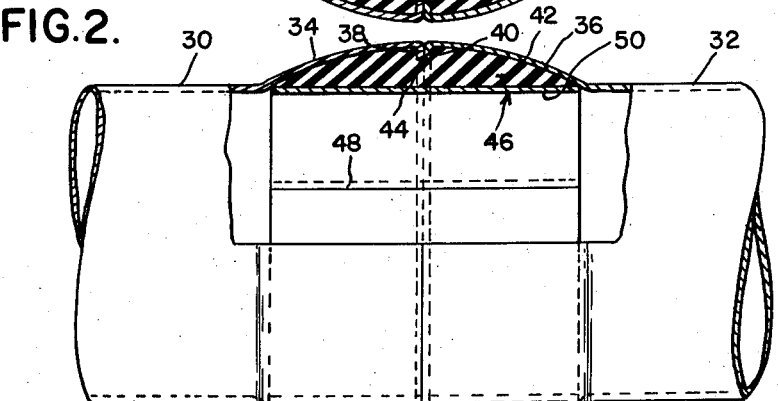
Figure 2 is a view similar to Figure 1 showing a modified form of tube coupling.

In Figure 2 there is illustrated another embodiment of the present invention in which tubes 30 and 32 are provided with spheroidal enlargements 34 and 36 respectively. In this case however, the radius of curvature of the speroidal portions 34 and 36 is such that the center of curvature of any axial element thereof is located at the opposite side of the tube axis from such element. The ends of the spheroidal portions 34 and 36 are extended inwardly to provide radial flanges 38 and 40.

Received within the spheroidal portions 34 and 36 is a sealing and connecting gasket 42, the outer surface of which is spheroidally shaped to fit snugly within the spheroidal portions 34 and 36 of the tubes. The outer surface of the gasket 42 is provided with an annular groove 44 adapted to receive the flanges 38 and 40. As thus far described, the construction is identical with that of Figure 1 except for the longer radius of curvature of the spheroidal portions 34 and 36. However, the embodiment of the invention illustrated in Figure 2 is provided with a sleeve 46 which is preferably formed of thin metal and is provided with a longitudinally extending slit or split 48 which renders the sleeve radially expansible. The slit 48 preferably extends at an oblique angle to the wall of the sleeve, or in other words, is non-radial with respect thereto.

As illustrated in this figure, the opening 50 through the sleeve 46 is of the same internal diameter as that of the tubes 30 and 32 so that the interconnection of the tubes by the assembly compressing the gasket and sleeve does not affect flow of fluid therethrough.

Figure 3:
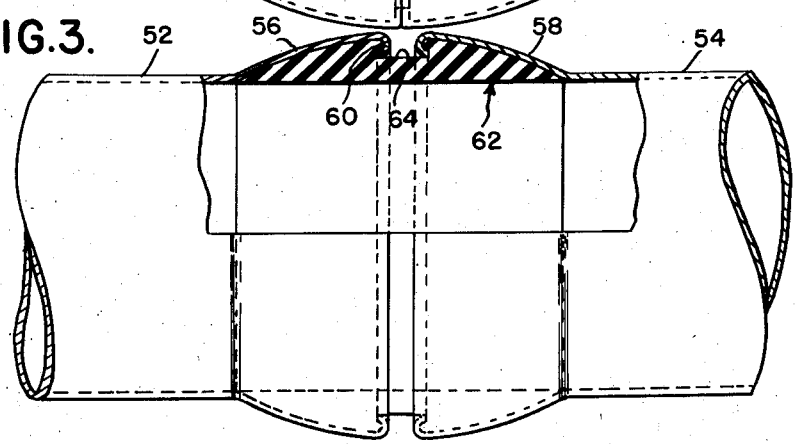
Figure 3 is a view similar to Figure 1 showing a further modification of tube coupling.

Referring now to Figure 3 there is illustrated yet another embodiment of the present invention in which the ends of the tubes 52 and 54 are enlarged to provide the spheroidal portions 56 and 58. In this case the ends of the enlarged spheroidal portions are extended inwardly to provide the flanges 60, but these flanges are non-radial and are curved or reversely bent to provide the generally hook shape illustrated in the figure. This provides a more secure interlock with the material of the gasket.

Received within the spheroidal portions 56 and 58 is the connecting and sealing gasket 62 which, as in all cases, is formed of resilient compressible material. The gasket 62 is provided with an external annular groove 64 which receives the flanges 60. In this case however, the groove 64 is of substantial width so that the flanges 60 at the ends of the tubes are spaced apart in the assembly. Again, as in all cases, the ends of the gasket 62 are tapered to a substantially knife edge in order to provide an efficient seal under pressure conditions within the tubing.

Referring now to Figure 4, there is illustrated another embodiment of the present invention which differs from those previously described primarily in that it is illustrated as designed for use with thick walled tubing or piping. In this figure tubes or pipes 66 and 68 are illustrated which may in this instance be formed of cement, transite, asbestos, paper, clay tile, metal or other material. In this case the inner surface adjacent the ends of the tubes 66 and 68 is recessed outwardly as indicated at 70, to provide spheroidal recesses terminating at the extreme ends of the pipes 66 and 68 in inwardly extending flanges 72. The sealing and coupling gasket 74 is formed of resilient compressible material, has an external surface spheroidally shaped to conform to the spheroidal recesses in the ends of the pipe, and is provided with an external annular groove 76 adapted to receive the flanges 72 which may be in abutment or which may be slightly spaced apart as illustrated in the figure. In this illustrated embodiment of the invention the internal diameter of the gasket 74 is the same as the internal diameter of the pipes 66 and 68 so that the mechanical coupling and seal is effected without restricting the flow of fluid in the piping. Again, the ends of the gasket 74 are tapered to a substantially knife edge.

Referring to Figure 5 there is illustrated an embodiment of the present invention in which tubes 80 and 82 are of uniform diameter throughout their length and are provided at the adjacent ends thereof with inwardly extending flanges 84. A sealing gasket 86 is provided having an external generally cylindrical shape adapted to be snugly received within the ends of the tubes 80 and 82, and an annular groove 88 is provided which receives the flanges 84. As illustrated in this figure, the flanges 84 are in abutment with each other and engage radial abutment shoulders provided at opposite sides of the groove 88. However, the shoulders provided by the groove may be spaced apart so as to provide clearance between the flanges 84 of the adjacent tubes. In this instance the internal passage through the gasket 86 is of variable cross-section so as to provide the substantially knife edged end portions illustrated at 90. The passage through the gasket is provided with a smoothly curved contour in axial section so as to produce a Venturi effect. It is found that a Venturi-like passage through the gasket as illustrated in this figure, does not materially affect flow of fluid therethrough, so long as the opening through the Venturi is not unduly restricted. The throat of the Venturi is in the plane of the groove 88.

Referring now to Figure 6, there is illustrated another embodiment of the present invention in which the tubes or pipes 90 and 92 have their end portions enlarged to provide spheroidal enlargements 94 terminating in inwardly extending flanges 96. In this case the coupling and sealing gasket 98 has spheroidally formed end portions 100 shaped to fit snugly within the spheroidal enlargements 94 and is provided with a pair of external annular grooves 102, each of which receives one of the flanges 96 on the pipes 90 and 92. In this case the gasket 98 is thus provided with a central portion 104 which extends between the adjacent ends of the pipes 90 and 92, and the flanges 96 are received in separate axially spaced grooves 102. However, the grooves 102 constitute groove means receiving the flanges and provided with abutment shoulders against which the flanges engage to provide for mechanical connection between the pieces.

As in all embodiments of the invention, the ends of the gasket 98 are tapered to substantially knife edges to provide an effective fluid seal.

Referring now to Figure 7 there is illustrated another embodiment of the present invention in which pipes 106 and 108 are provided with spheroidal enlargements 110 terminating in inwardly extending flanges 112. In this case the gasket 114 is provided with a plurality of reinforcing members 116 preferably formed of thin metal. As illustrated in Figure 7, the reinforcing members 116 are embedded within resilient compressible material such as rubber, although if preferred the reinforcing members could be at the inner surface of the gasket and merely provided with the flexible resilient material at their outer surfaces and extending axially beyond their ends. The gasket 114 is provided with an external annular groove 118 which receives the flanges 112. In the illustrated embodiment of the invention the groove 118 is provided with spaced apart abutment surfaces 120 against which the inner surfaces of the flanges 112 engage, and the groove is of sufficient width so that the flanges 112 are spaced apart in the complete assembly. Obviously, the width of the groove may be less so that in the assembly the flanges 112 are in abutment with each other. It is particularly to be noted that the internal reinforcing members 116 are shaped to provide shoulders 122 which reinforce the abutment shoulders of the groove, thereby greatly strengthening the mechanical interlock produced by the engagement between the flanges 112 and the shoulders 120 of the groove.

Instead of providing a plurality of reinforcing members or clips as described in the foregoing, the gasket may be reinforced by an annular reinforcing member embedded therein or carried at the inner surface thereof, but in such case it will be appreciated that the portions of the reinforcing member corresponding to the shoulders 122 of the clips must be located radially within the inner surface of the flanges 112 to permit assembly of the coupling.

While in the several embodiments of the invention, the tube or pipe has in some instances been illustrated as thin walled and in other instances as relatively thick walled such for example as in cement pipe, it will be appreciated that in general the invention is applicable to tubes or pipes of any wall thickness and formed of any material. In all cases the ends of the pipes themselves are rigid and are shaped to cooperate with an annular gasket, end portions of which are received within adjacent ends of the tubes or pipes. In all cases a mechanical interlock is provided between inwardly extending flanges at the ends of the tubes or pipes and a fluid-tight seal is provided by the interfitting relation between the gasket and the inner surfaces of the tube ends and particularly by the substantially knife edged ends of the gasket.

As so far described, the invention contemplates the use of a gasket which is insertable in and removable from both tube ends. However, in some cases the gasket may be bonded to one or both of the tubes. Thus, in some cases the gasket may be bonded by heat and/or pressure to one of the tube ends so as to become a permanent part thereof and may be insertable in and removable from the end of the adjacent tube. Where the gasket is made of good quality rubber, it is possible to effect a bond between the rubber and the wall of the tube or pipe, the strength of the bond exceeding the strength of the rubber. Bonding suitable for this purpose is well understood in the art. In some cases it may be desirable to provide a permanent bond between the gasket and both of the coupled tubes after assembling of the parts into a completed joint. The joint produced by permanent bonding the gasket to both of the coupled tube ends will of course require destruction to separate the tubes.

The drawings and the foregoing specification constitute a description of the improved flexible tube coupling in such full, clear, concise and exact terms as to enable any person skilled in the art to practice the invention, the scope of which is indicated by the appended claim.

What I claim as my invention is:

Tube coupling construction comprising a pair of aligned tubes having inner cylindrical surfaces of uniform cross-section throughout their length including the end portions thereof, said tubes having radially inwardly directed flanges at their adjacent ends, the end surfaces of said tubes being in abutment, a connecting and sealing gasket of annular shape composed essentially of yielding resilient material such as rubber, said gasket extending into the adjacent end portions of both of said tubes, said gasket having a cylindrical external surface fitting snugly within the end portions of the tubes and having an annular groove spaced from the ends thereof in which said flanges are received, the material of said gasket being sufficiently yieldable and resilient to provide for movement of said flanges over the end portions of said gasket into said groove and return of said portions into engagement with the inner surfaces of said flanges, the side walls of said grooves providing abutment shoulders holding said flanges in abutment with each other, said gasket constituting the sole means connecting said tubes together, said gasket having an axially extending opening therethrough of Venturi-like shape having its throat in the transverse plane of said groove, said throat having a cross-sectional area sufficient to provide substantially unrestricted fluid flow therethrough, the internal fluid pressure acting against the inner surface of said gasket having axial components directed toward the plane of said groove assisting said gasket in holding said flanges in abutment, the ends of said gasket forming thin flexible lips held by fluid pressure within the tubes in sealing engagement with their inner surfaces.

References Cited in the file of this patent

UNITED STATES PATENTS

| | | |
|---|---|---|
| 465,617 | Lynch | Dec. 22, 1891 |
| 523,583 | Lynch | July 24, 1894 |
| 1,876,455 | Inshaw | Sept. 6, 1932 |
| 2,014,313 | Damsel | Sept. 10, 1935 |
| 2,168,631 | Scott | Aug. 8, 1939 |
| 2,273,395 | Couty | Feb. 17, 1942 |
| 2,438,145 | Caminez | Mar. 23, 1948 |
| 2,470,359 | McLean | May 17, 1949 |
| 2,517,290 | De Moude et al. | Aug. 1, 1950 |
| 2,567,773 | Krupp | Sept. 11, 1951 |
| 2,650,115 | Taylor | Aug. 25, 1953 |

FOREIGN PATENTS

| | | |
|---|---|---|
| 155,606 | Great Britain | Dec. 30, 1920 |
| 668,917 | Great Britain | Mar. 26, 1952 |